D. E. J. BROCKETT.
ADJUSTABLE ANTISKID DEVICE.
APPLICATION FILED JUNE 28, 1909.
953,658.
Patented Mar. 29, 1910.
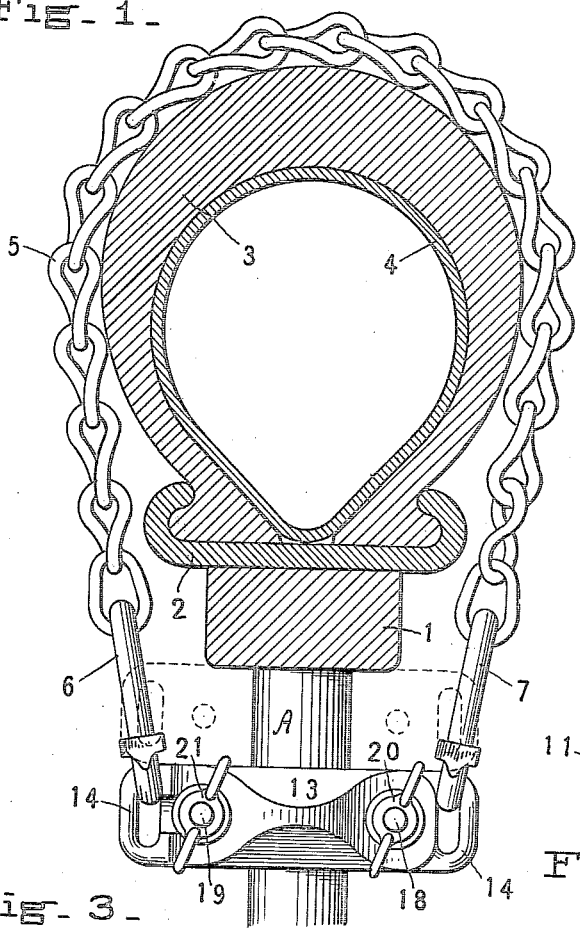
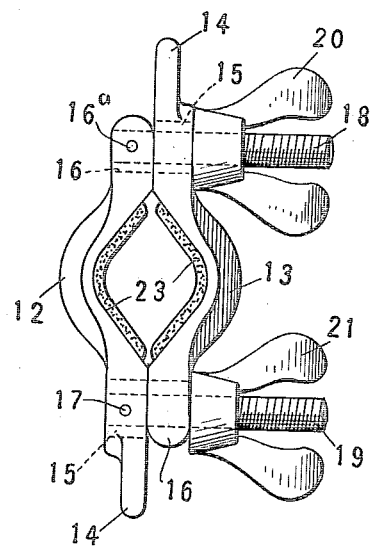
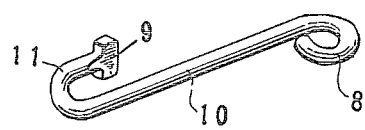
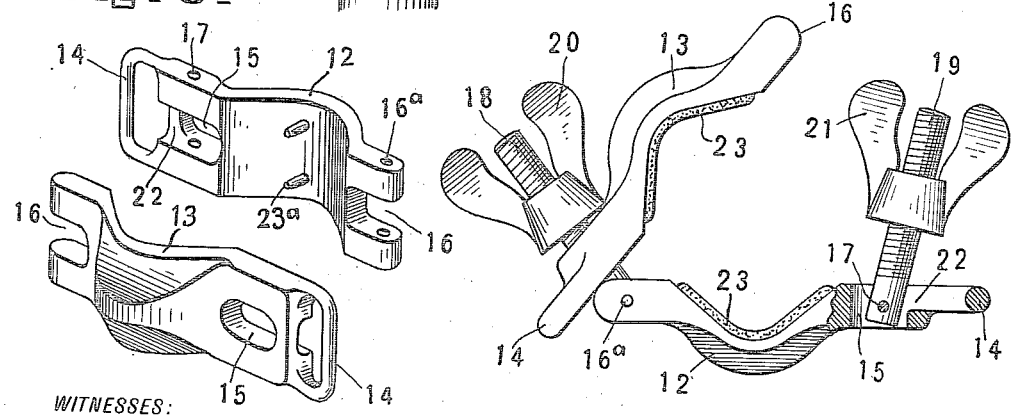
WITNESSES:
J. Seyde Ripley.
Kate Brenner.
INVENTOR
Don E. J. Brockett
BY
C. A. H. Barber.
ATTORNEY

UNITED STATES PATENT OFFICE.

DON E. J. BROCKETT, OF CLEVELAND, OHIO.

ADJUSTABLE ANTISKID DEVICE.

953,658.  Specification of Letters Patent.  Patented Mar. 29, 1910.

Application filed June 28, 1909. Serial No. 504,732.

*To all whom it may concern:*

Be it known that I, DON E. J. BROCKETT, a citizen of the United States, and a resident of Cleveland, in the county of Cuyahoga and State of Ohio, have invented certain new and useful Improvements in Adjustable Antiskid Devices, of which the following is a full, clear, and exact description, whereby any one skilled in the art may make and use the same.

The invention relates to an adjustable traction or anti-skid device applicable to vehicle wheels.

It is designed particularly for use in connection with vehicle wheels having tires of large surface, which are liable to skid, particularly where used on self-propelled vehicles.

The objects of the invention are to produce a very substantial, yet simple device which may be readily adjusted to wheels and tires of various sizes, and may be readily removed therefrom.

A further object is to provide a device in which the traction member may be readily attached to the retaining or holding device by direct interlocking connections which coöperate with said holding device to permit adjustment of the grip through the adjustment of the holding device.

In the accompanying drawings Figure 1 shows a cross-sectional view through a tire of the pneumatic type illustrating the improved anti-skid device applied thereto. Fig. 2 is a plan view of the retaining or holding device. Fig. 3 is a perspective view of the two coöperating clamp bars or members of the holding device. Fig. 4 is a detail perspective view of the connecting lock intermediate the tread-grip and holding device. Fig. 5 is a plan view of the holding device illustrated in Fig. 2, showing the clamp members in open position.

It has been a common practice to employ various forms of traction devices to vehicle wheels. Such traction devices have, in many cases, consisted of transverse gripping members extending over the tread of the tire and coöperating with circumferential members by which the gripping members are held in specified relation with reference to the tires. In such devices, the change from one size of tire to another often interferes with the proper use of the traction device, and necessitates having a traction device of a form and size to fit some specific form and size of tire.

It is one of the principal objects of the present invention to arrange detachable traction members in such manner that they may be immediately attached to or removed from the tire through their connection with a holding member and to arrange the holding member for radial adjustment with reference to the wheel in such manner that the traction device will always be properly adjusted with reference to the tire whatever its size and shape may be.

In the accompanying drawings, the numeral 1, denotes the felly of a wheel provided with a rim 2, which, as herein shown, is of the "clencher-type" and supports a pneumatic tire consisting of an outer shoe or casing 3, and the inner air tube 4.

The traction or gripping member 5, as shown herein, consists of a chain passing about the tire and having on its opposite ends locking members 6, 7, of a suitable form to engage the opposite ends of a retaining device. These gripping members 5, may be arranged in any desired number upon the wheel and the retaining members are designed to be applied to the spokes of the wheel adjacent to the rim. Obviously, a gripping device may be arranged adjacent to each spoke or as many spokes of the wheel as desired.

The locking members 6, and 7, are identical in construction, and, as shown in Fig. 4, consist of a loop member 8, which is secured about the end chain links of the tread member and are preferably formed integral with a locking lug 9, transversely arranged with reference to the bar or rod 10, and at the end of a down-turned hook 11. The locking lug 9, is of a proper form and size to coöperate with locking loops suitably arranged upon the retaining member as hereinafter described.

The retaining member consists of two clamp bars 12, 13, which, as shown in Fig. 3, are similar in form and construction. Each of these clamp bars has at one end a loop member 14, a clamp bolt opening 15, adjacent thereto, and a lock bolt opening 16, at the opposite end from the loop 14. The members are of considerable width in order to provide sufficient bearing surface upon the spoke to which they are designed to be clamped. By using the two clamp members of identical form and placing them in opposed positions with reference to each other, the loops 14, will extend on opposite sides of the spoke and by having the locking bolt pivoted in the clamp bolt opening 15, of one of said members, as at 17, and the clamping bolt pivoted in the lock bolt opening 16 of said member, said clamp bolt may be extended through the clamp bolt opening 15, of the opposing member, while the locking bolt may be swung into and out of the locking bolt opening 16, of said second member.

Referring to Fig. 2, it will be seen that the clamping bolt 18, passes through the clamp bolt opening 15, in the member 13, and is pivoted as at 16ª, in the lock bolt opening 16, of the member 12. The locking bolt 19, is pivoted as at 17, in the clamp bolt opening 15, of the member 12, and extends through the slotted lock bolt opening 16, of the member 13.

With this arrangement, the loops 14, will extend on opposite sides of the spoke A, and the two clamp members may be securely bound to said spoke by screwing down the wing-nuts 20, 21, upon the clamp bolt 18, and lock bolt 19. The device thus affords a very flexible and convenient adjustment in which the two clamp members may be readily adjusted to various sizes of spokes by loosening the wing-nut 20, until the desired parallelism is secured between the clamp members, and then firmly locking said members by swinging the locking bolt 19, into the opening 16, until the wing-nut 21, rests upon the outer surface of the clamp member 13. By screwing down the nut 21, the clamp is securely bound to the spoke.

The clamp bolt opening 15, has a counter-sunk recess 22, which permits the locking bolt 19, to swing upon its pivot 17, in order to clear the lock bolt opening 16 at the end of the opposing clamp member.

As shown in Fig. 5, a slight loosening of the nut 21, will permit swinging the locking bolt 19, clear of the clamp member 13, and thereupon, said member, through its loose connection with the clamp bolt 18, may be swung with said bolt away from the clamp member 12.

It is apparent that, with this arrangement of identical parts, the assembly and adjustment may be most easily and efficiently secured and the two clamp members may be arranged in any parallel position to accommodate the clamp to spokes of different sizes. In practice, the inner surfaces of the clamp members are provided with resilient buffers 23, to prevent abrasion of the surface of the spoke and to give a slight springing action which will tend to more firmly lock the parts against accidental movement when the nuts 20, 21, are fully screwed down. By using clamp members of identical form, in reverse position, the two wing-nuts are located on the same side of the clamp and therefore will cause no confusion to the operator when tightening or loosening the same. Obviously, if the wing-nuts are located on opposite sides of the clamp, one will be in "right-handed" position while the other is in "left-handed" position, when considered from the position occupied by the user at one side of the wheel.

The loops 14, are of a sufficient size to receive the elongated locking head 9, formed on the attaching links at opposite ends of the tread grip. The lugs 9, are also of sufficient width to prevent accidental separation from the loops 14, unless turned into registering position with reference thereto.

In Fig. 1, the method of applying the device is illustrated. The dotted outline shows the position of the retaining device where the chain is to be applied. One of the attaching members of the chain may then be passed through one of the loops 14, and turned until the up-turned loop 11, bears against the loop 14. Thereupon, with the retaining device in the position indicated by dotted outlines, the locking head 9, of the attaching links 7, may then be passed through its loop 14. By then moving the retaining device along the spoke, the desired tension upon the tread grip or chain 5, may be secured and the attaching members 6, and 7, will be prevented from turning sufficiently to disengage themselves from the loops 14. There is also a further advantage in having the two clamp members 12, 13, of identical form and each bearing a loop member. Oftentimes, the spokes are of irregular cross-section and by having the two clamp members connected through the bolts and openings as described, it is possible to adjust them perfectly with reference to the spoke, as one may be moved lengthwise of the other, to quite a considerable degree, to properly center the clamp members with reference to the spoke.

The outer surface of each of the clamp members adjacent to the lock bolt opening 16, is slightly beveled from the end back toward the body of the clamp, thus affording a tilted seat against which the wing-nut 21, will bind. This will prevent accidental disengagement of the parts.

Obviously, the exact details might be varied to a considerable extent without departing from the spirit or intent of the invention which contemplates the various features of adjustment and interchangeability set forth.

What I claim as my invention and desire to secure by Letters Patent is:—

1. An anti-skid device consisting of a retaining member and a flexible gripping member, the latter adapted to extend across the tread of a tire and with its ends removably attached to the retaining member, said retaining member consisting of a pair of clamp members each bearing a loop and arranged on opposite sides of a wheel-spoke, a clamping bolt and a locking bolt pivoted to one of said members and extending through the other of said members, and means co-operating with said bolts for locking said members to a vehicle-spoke.

2. An anti-skid device consisting of a retaining member and a flexible gripping member, the latter adapted to extend across the tread of a tire and with its ends removably attached to the retaining member, said retaining member comprising a pair of clamp members adapted to embrace a spoke of a wheel, a loop at one end of each of said clamp members, a bifurcated opening at the opposite end thereof, a perforation intermediate said loop and bifurcated opening, a clamping bolt pivoted in the bifurcated end of one of said members and passing through the perforation of the other of said members, a locking bolt pivoted in one of said members and adapted to pass through the bifurcated opening of the other of said members, and means appurtenant to said bolts for clamping the members in position.

3. An anti-skid device consisting of a retaining member and a flexible gripping member, the latter adapted to extend across the tread of a tire, and provided on opposite ends with a locking hook, said retaining member provided with means for adjustable attachment to a wheel-spoke, and provided on opposite ends thereof with locking loops and locking heads upon the hooks adapted to pass through the loops when brought into registering position therewith.

4. An anti-skid device consisting of a retaining member and a flexible gripping member, the latter adapted to extend across the tread of a tire and provided at opposite ends with locking hooks by which it is removably attached to the retaining member, said retaining member provided with loops at opposite ends thereof, formed to receive the locking hooks when the latter are brought into predetermined registering position with reference thereto, and locking lugs projecting laterally upon the hooks to prevent dis-engagement of the hooks and loops.

5. An anti-skid device consisting of a retaining member and a flexible gripping member, the latter adapted to extend across the tread of a tire and provided with means of attachment to and detachment from the retaining member, said retaining member comprising a pair of clamp members of similar form, each having a loop at one end and a bifurcated opening at the opposite end, said clamp members arranged in opposition one to the other, whereby the loop of one member extends beyond the bifurcation of the second member, and adjustable means for clamping said members to a wheel-spoke.

DON E. J. BROCKETT.

Witnesses:
M. E. BOYER,
E. J. HART.